United States Patent
Atif et al.

(10) Patent No.: US 10,884,583 B2
(45) Date of Patent: Jan. 5, 2021

(54) SUPPRESSING THE COLLECTION OF ACTIVITY DATA BY AN OPERATING SYSTEM

(71) Applicant: MICROSOFT TECHNOLOGY LICENSING, LLC, Redmond, WA (US)

(72) Inventors: Muhammad Atif, Bellevue, WA (US); Kenneth M. Tubbs, Issaquah, WA (US); Arya Dustin Afrashteh, Bellevue, WA (US); Jianchun Chen, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 284 days.

(21) Appl. No.: 15/883,757

(22) Filed: Jan. 30, 2018

(65) Prior Publication Data
US 2019/0163326 A1   May 30, 2019

Related U.S. Application Data

(60) Provisional application No. 62/592,376, filed on Nov. 29, 2017.

(51) Int. Cl.
*G06F 3/0482* (2013.01)
*G06F 3/0484* (2013.01)
(Continued)

(52) U.S. Cl.
CPC ........ *G06F 3/0482* (2013.01); *G06F 3/04847* (2013.01); *G06F 8/34* (2013.01);
(Continued)

(58) Field of Classification Search
CPC ......... G06F 3/0482; G06F 9/451; G06F 9/543
See application file for complete search history.

(56) References Cited

U.S. PATENT DOCUMENTS 6,604,096 B1 * 8/2003 Couch ................. G06F 16/217
2002/0174073 A1 * 11/2002 Nordman ........... G06F 21/6254
705/64

(Continued)

FOREIGN PATENT DOCUMENTS

WO         0127724 A1    4/2001
WO      2016175764 A1   11/2016

OTHER PUBLICATIONS

"Framework Patterns: Exception Handling, Logging, and Tracing", Retrieved From: http://catalogue.pearsoned.co.uk/samplechapter/0321130022.pdf, Jul. 17, 2003, pp. 45-200.

(Continued)

*Primary Examiner* — Eric J. Bycer
(74) *Attorney, Agent, or Firm* — Newport IP, LLC; Mike R. Cicero

(57) ABSTRACT

Technologies are described for suppressing the collection of activity data by an operating system. An operating system provides an application programming interface ("API") through which applications can submit activity data. The activity data can be exposed to users through a UI that includes UI controls that can be selected to resume previously performed activities. The operating system also provides another UI that includes UI controls for specifying that collection of activity data by the operating system is to be suppressed. When the UI control is selected, the API will discard activity data received from applications. Another selection of the UI control will instruct the API to resume collection and storage of activity data provided by the applications. The UI for suppressing the collection of activity data can also include another UI control which, when selected, will cause activity data previously obtained by the API and stored to be discarded.

20 Claims, 8 Drawing Sheets

(51) Int. Cl.
*G06F 9/451* (2018.01)
*G06F 9/54* (2006.01)
*G06F 9/445* (2018.01)
*G06F 11/30* (2006.01)
*G06F 11/34* (2006.01)
*G06F 21/62* (2013.01)
*G06F 8/34* (2018.01)

(52) U.S. Cl.
CPC .......... *G06F 9/44505* (2013.01); *G06F 9/451* (2018.02); *G06F 9/543* (2013.01); *G06F 11/302* (2013.01); *G06F 11/3072* (2013.01); *G06F 11/3438* (2013.01); *G06F 21/629* (2013.01); *G06F 21/6245* (2013.01)

(56) References Cited

U.S. PATENT DOCUMENTS

| | | | | |
|---|---|---|---|---|
| 2010/0146301 | A1* | 6/2010 | Shevchenko | G06F 21/6263 713/193 |
| 2011/0141276 | A1* | 6/2011 | Borghei | H04W 12/08 348/143 |
| 2011/0161172 | A1* | 6/2011 | Lee | G06Q 30/0257 705/14.55 |
| 2011/0202881 | A1* | 8/2011 | Singh | G06F 21/6245 715/833 |
| 2012/0192247 | A1* | 7/2012 | Oliver | G06F 21/6245 726/1 |
| 2012/0278830 | A1* | 11/2012 | Khoshgozaran | G06Q 30/02 725/25 |
| 2012/0304286 | A1* | 11/2012 | Croll | G06F 21/6263 726/22 |
| 2013/0067378 | A1* | 3/2013 | Au | G06F 11/32 715/771 |
| 2014/0074896 | A1* | 3/2014 | Bushman | G06Q 10/1091 707/805 |
| 2014/0115506 | A1* | 4/2014 | George | G06F 11/3438 715/764 |
| 2014/0359475 | A1* | 12/2014 | Venkatesh | G06F 3/0484 715/747 |
| 2015/0130774 | A1* | 5/2015 | Kruger | H04M 1/72577 345/184 |
| 2016/0066189 | A1 | 3/2016 | Mahaffey et al. | |
| 2017/0250992 | A1* | 8/2017 | Howard | H04L 63/102 |
| 2018/0123822 | A1* | 5/2018 | Zibuschka | H04L 67/22 |

OTHER PUBLICATIONS

"International Search Report and Written Opinion Issued in PCT Application No. PCT/US2018/060214", dated Feb. 19, 2019, 13 Pages.

* cited by examiner

SUPPRESSING THE COLLECTION OF ACTIVITY DATA BY AN OPERATING SYSTEM

CROSS-REFERENCE TO RELATED APPLICATIONS

This application claims the benefit of U.S. provisional patent application No. 62/592,376, entitled "SUPPRESSING THE COLLECTION OF ACTIVITY DATA BY AN OPERATING SYSTEM", which was filed on Nov. 29, 2017, and which is expressly incorporated herein by reference in its entirety.

BACKGROUND

Modern computing devices enable users to perform a seemingly endless variety of activities. As a result, users of such computing devices commonly engage in many different types of activities on a daily basis such as performing productivity activities like creating documents in word processing applications, engaging in creative activities like editing photos, and enjoying entertainment activities like watching streaming movies.

Due to the large numbers of activities computing users engage in, it can be difficult for users to later resume those activities, particularly when the activities were performed a long time in the past. As a result, users commonly perform searches to locate data related to previously performed activities to resume those activities. For example, a user might search for a word processing document that they previously edited to resume editing of the document. Searching for content relating to previously performed activities in this manner can, however, utilize significant computing resources, such as processor cycles and memory.

Some computing systems provide a "recently used file list," that lists documents previously opened or saved by a user. Recently used file lists, however, typically only include a limited number of entries (e.g. ten) and, therefore, it might still be difficult for a user to resume editing a word processing document, for example, that is not listed in a recently used file list. Moreover, entries in recently used file lists are typically made only in response to the opening or saving of documents. As a result, such lists commonly do not include other types of content relating to previously performed activities that do not involve opening or saving a local file, such as movies previously streamed over the internet. Consequently, users are forced to search for content relating to previously performed activities in the manner described above and, therefore, computing resources are utilized inefficiently.

It is with respect to these and other technical considerations that the disclosure made herein is presented.

SUMMARY

Technologies are described herein for suppressing the collection of activity data by an operating system. Through an implementation of the technologies disclosed herein, applications can submit data ("activity data") identifying activities performed by a user to an operating system. The data can be utilized to present a user interface ("UI") through which the identified activities can be resumed. Because applications provide the activity data, any type of activity performed on a computing system can be resumed without searching or using a recently used file list. As a result, the use of computing resources like processor cycles and memory can be reduced as compared to previous solutions.

Because the collection of activity data also requires the utilization of computing resources, the technologies disclosed herein also include a mechanism for suppressing, or disabling, the collection of activity data by an operating system. Disabling the collection of activity data in the manner described above can also reduce the utilization of computing resources and, potentially, improve privacy by not exposing data identifying activities that a user has previously engaged in.

According to one embodiment disclosed herein, an operating system provides an application programming interface ("API") through which applications can submit activity data. The activity data identifies an application and an activity associated with the application. For example, a streaming video application might provide activity data to the API that identifies itself and the identity of a movie that a user previously watched using the application. As another example, a web browser application might provide activity data to the API identifying itself and a web page that a user previously visited. The API stores the activity data in a data store. In some embodiments, the activity data can be synchronized between multiple devices associated with the same user using a network service.

The activity data can also be exposed through a UI. For example, a UI can be presented that includes UI controls such as thumbnail images and/or text that correspond to activities previously engaged in by a user. UI controls like thumbnail images and/or text associated with activity data synchronized from other devices associated with a user can also be presented in the UI. The UI controls can include the activity data, thereby identifying the application and the previously performed activity to the user.

Selection of one of the UI controls (e.g. thumbnail images) in the UI by a user will resume the previous activity. For example, a streaming video application might be executed, and a movie previously viewed by a user using the streaming video application might be resumed. As another example, a web browser application might be executed, and a web page previously visited by a user might be loaded. Other types of UIs for presenting the activity data and resuming previously performed activities can be utilized in other embodiments.

As discussed briefly above, collection of activity data in the manner described above can consume valuable computing resources like processor cycles and memory and, additionally, can expose sensitive personal information. To address this technical problem, and potentially others, the disclosed technologies also provide functionality for suppressing, or disabling, the collection of activity data by an operating system.

In one embodiment, an operating system provides a UI that includes UI controls for specifying preferences regarding the collection of activity data by the operating system. One of the UI controls, when selected, will cause an API provided by the operating system for collecting activity data to discard activity data received from applications. In this manner, activity data provided by applications is not stored in a data store or other location.

Another selection of the UI control will instruct the operating system to resume collection of activity data provided by the applications. Following resumption of the collection of activity data, the API provided by the OS will store activity data provided by applications in a data store or other location. As discussed above, the activity data can be presented in another UI through which a user can view and resume previously performed activities.

In some embodiments, the UI for disabling collection of activity data also includes another UI control which, when selected, will cause previously stored activity data to be removed from a data store or other location. In this manner, a user can delete their entire activity history, thereby maintaining their privacy.

Suppressing the collection of activity data by an operating system in the manner disclosed herein can improve the operation of a computing system by allowing the computing system to operate more efficiently and conserve valuable computing resources. Suppression of the collection of activity data by an operating system can also prevent the disclosure of a user's personal information. Other technical benefits not specifically identified herein can also be realized through implementations of the disclosed technologies.

It should be appreciated that the above-described subject matter can be implemented as a computer-controlled apparatus, a computer-implemented method, a computing device, or as an article of manufacture such as a computer readable medium. These and various other features will be apparent from a reading of the following Detailed Description and a review of the associated drawings.

This Summary is provided to introduce a brief description of some aspects of the disclosed technologies in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1A:
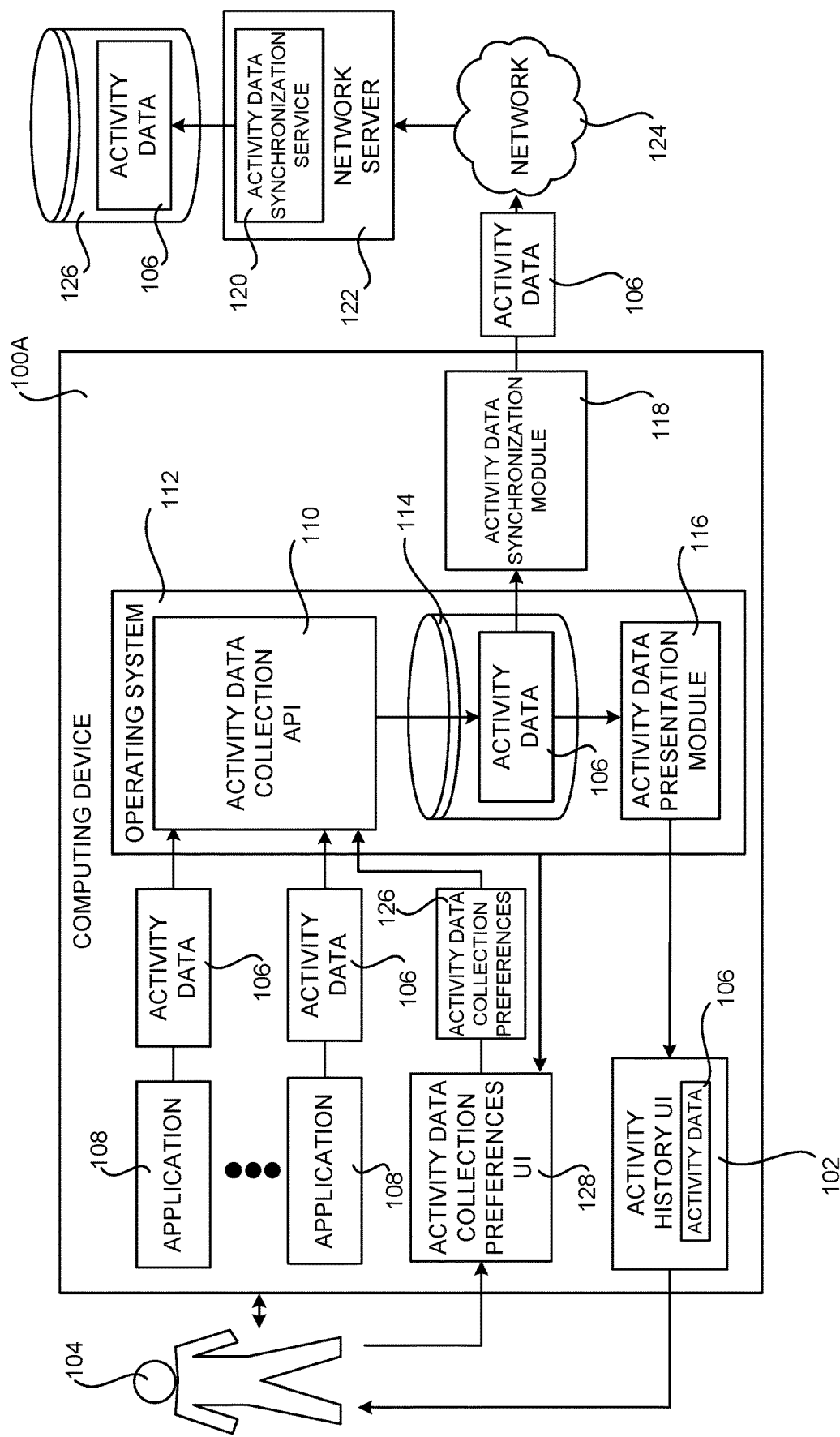
FIG. 1A is a network architecture diagram showing aspects of a system for suppressing the collection of activity data by an operating system, according to one particular embodiment.

The following detailed description is directed to technologies for suppressing the collection of activity data by an operating system. As discussed briefly above, implementations of the technologies disclosed herein can reduce the utilization of processor cycles, memory, and other computing resources. Other technical benefits not specifically identified herein might also be realized through an implementation of the technologies disclosed herein.

While the subject matter described herein is presented in the general context of program modules that execute in conjunction with the execution of an operating system and application programs on a computer system, those skilled in the art will recognize that other implementations can be performed in combination with other types of program modules. Generally, program modules include routines, programs, components, data structures, and other types of structures that perform particular tasks or implement particular abstract data types. Moreover, those skilled in the art will appreciate that the subject matter described herein can be practiced with other computer system configurations, including hand-held devices, multiprocessor systems, microprocessor-based or programmable consumer electronics, computing or processing systems embedded in devices (such as wearables, automobiles, home automation etc.), minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several FIGS., aspects of various technologies for suppressing the collection of activity data by an operating system will be described.

Prior to discussing the FIGS., it is to be noted that various components in the configurations described below can collect and utilize data describing user activity taking place on a computing system. In all configurations disclosed herein, users are explicitly informed of the type of data that will be collected. Users must also expressly consent to the collection of such data following the disclosure of the data collection and prior to the actual data collection taking place. Moreover, no personally identifiable information ("PII") is collected from users in any configuration disclosed herein.

FIG. 1A is a network architecture diagram showing aspects of a computing system for suppressing the collection of activity data by an operating system (which might be referred to herein as an "OS"), according to one particular embodiment. The system illustrated in FIG. 1A includes a computing device 100A that is configured to collect activity data 106 from applications 108, and to provide an activity history UI 102 through which a user 104 can view the activity data 106. The activity history UI 102 can also include UI controls which, when selected, will resume previously performed activities. Additional details regarding this process are provided below.

In order to provide aspects of the disclosed technologies, an operating system 112 executes on the computing device 100A. The operating system 112 provides an activity data collection API 110 (which might be referred to herein as the "API") through which applications 108 can submit activity data 106. As discussed briefly above, the activity data 106 identifies an application 108 and an activity associated with the application 108 that a user 104 has previously engage in. For example, a streaming video application 108 might provide activity data 106 to the API 110 that identifies itself and the identity of a movie that a user 104 previously watched using the application 108. As another example, a web browser application 108 might provide activity data 106 to the API 110 identifying itself and a web page that a user 104 previously visited using the application 108. The API 110 stores the activity data 106 in a data store 114 or in another suitable location. As will be described in greater detail below, the activity data 106 can be synchronized between multiple devices associated with the same user 104 using a network service in some embodiments.

The activity data 106 can also be presented to a user 104 through a UI. For example, and as described briefly above, an activity data presentation module 116 can present an activity history UI 102 (which might be referred to herein as the "UI" 102) that includes UI controls, such as thumbnail images and/or text, that correspond to activities previously engaged in by a user 104 with the applications 108. The UI controls can present the activity data 106, thereby identifying the application 108 and the previously performed activity to the user 104. UI controls, like thumbnail images and/or text, associated with activity data 106 synchronized from other devices associated with a user 104 can also be presented in the UI 102. Additional details regarding the synchronization of activity data 106 between devices associated with a user 104 will be provided below.

Selection of one of the UI controls (e.g. thumbnail images) in the UI 102 by a user 104 will resume the associated previous activity. For example, a streaming video application 108 might be executed, and a movie previously viewed by a user 104 using the streaming video application 108 might be resumed. As another example, a web browser application 108 might be executed, and a web page previously visited by a user 104 with the web browser application 108 might be loaded.

Other types of UIs for presenting the activity data 106 and resuming previously performed activities can be utilized in other embodiments. In this regard it is to be appreciated that the UIs and UI controls described herein are merely illustrative and that other types of UIs, UI controls, and arrangements of UI controls can be utilized in other embodiments.

As discussed briefly above, collection of activity data 106 by an operating system 112 in the manner described above can consume valuable computing resources of the computing device 100A like processor cycles and memory and, additionally, can expose sensitive personal information of a user 104. To address this technical problem, and potentially others, the disclosed technologies also provide functionality for suppressing, or disabling, the collection of activity data 106 by an operating system 112.

In one embodiment, the operating system 112 provides an activities collection preferences UI 128 (which might be referred to herein as the "UI" 128) that includes UI controls for specifying activity data collection preferences 126. The activity data collection preferences 126 define whether activity data 106 is to be collected by the operating system 112 or not. One of the UI controls in the UI 128, when selected, will define activity data collection preferences 126 that cause the API 110 to discard activity data 106 received from the applications 108. In this manner, activity data 106 provided by the applications 108 is not stored in the data store 114 or other location.

Another selection of the UI control in the UI 128 will define activity data collection preferences 126 that instruct the operating system 112 and the API 110 to resume collection of activity data 106 provided by the applications 108. Following resumption of the collection of activity data 106, the API 110 will store activity data 106 provided by applications 108 in the data store 114 or in another suitable location.

In some embodiments, the UI 128 also includes another UI control which, when selected, will cause the OS 112 or the API 110 to remove previously stored activity data 106 from the data store 114 or other location. In this manner, a user 104 can delete their entire activity history, thereby maintaining their privacy. Additional details regarding the UI 128 will be provided below with regard to FIG. 2.

As shown in FIG. 1A and described briefly above, the activity data 106 can be synchronized to other computing devices 100 associated with the same user 104. In order to provide this functionality, the computing device 100A executes an activity data synchronization module 118 in one embodiment. The activity data synchronization module 118 retrieves the activity data 106 from the data store 114 and transmits the activity data 106 to a network server 122 over a network 124, like the internet.

An activity data synchronization service 120 executes on the network server 122. The activity data synchronization service 120 receives the activity data 106 and stores the activity data 106 in a data store 126. The activity data synchronization service 120 also receives and stores activity data 106 from other computing devices 100 associated with a user 104.

The activity data synchronization service 120 then synchronizes the activity data 106 between all of the computing devices 100 associated with the user. In this manner, a user 104 can resume previously performed activities on any of their computing devices 100. Additional details regarding this process will be provided below with regard to FIGS. 1A and 1B.

Figure 1B:
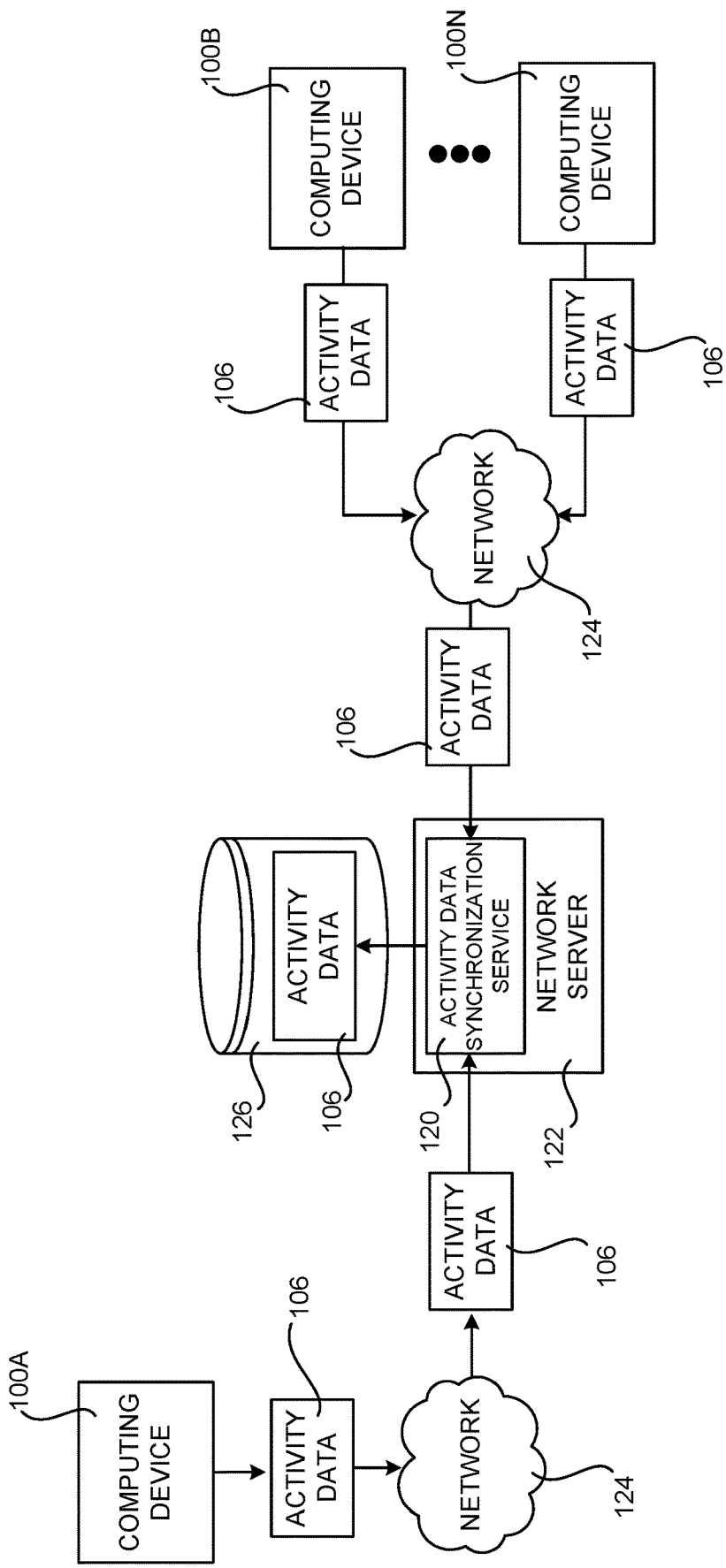
FIG. 1B is a network architecture diagram showing further aspects of the system shown in FIG. 1A for suppressing the collection of activity data by an operating system, according to one particular embodiment.

FIG. 1B is a network architecture diagram showing further aspects of the system shown in FIG. 1A for suppressing the collection of activity data by an operating system, according to one particular embodiment. As shown in FIG. 1B, and described briefly above, the computing device 100A transmits the activity data 106 to the network server 122 via the network 124. The activity data synchronization service 120 executing on the network server 122 receives the activity data 106 and stores the activity data 106 in the data store 126.

As also illustrated in FIG. 1B, other computing devices 100A and 100B associated with the same user 104 can also transmit activity data 106 to the network server 122. The activity data synchronization service 120 also stores the activity data 106 received from the computing devices 100A and 100B in the data store 126. In this manner, the network server 122 obtains activity data 106 from all of the computing devices 100A-100N associated with a user 104. As discussed in greater detail below, the network server 122 can also provide activity data 106 to the computing devices 100A-100N in order to synchronize the activity data 106 between all of the computing devices 106 associated with a user 104.

Figure 1C:
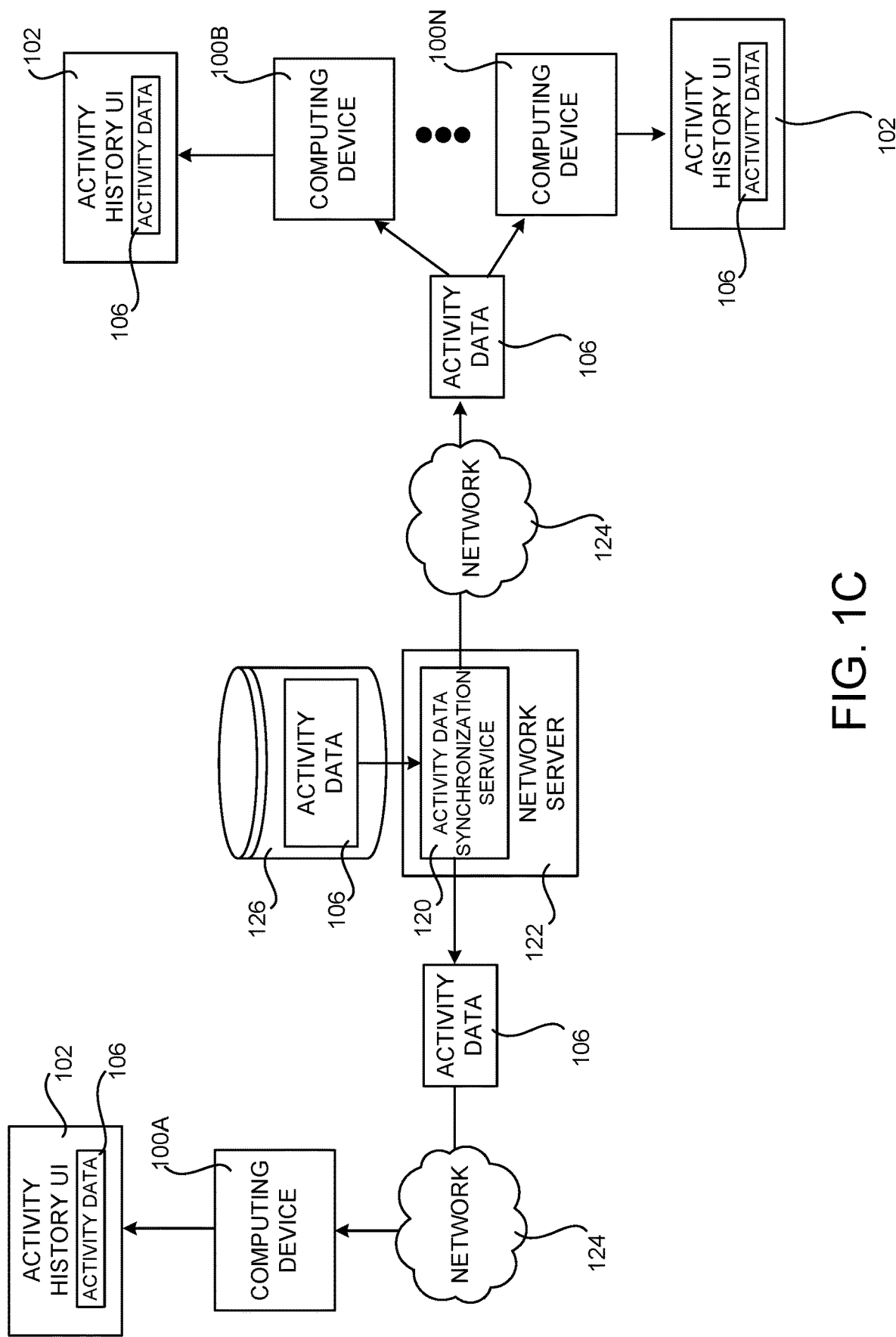
FIG. 1C is a network architecture diagram showing further aspects of the system shown in FIGS. 1A and 1B for suppressing the collection of activity data by an operating system, according to one particular embodiment.

FIG. 1C is a network architecture diagram showing further aspects of the system shown in FIGS. 1A and 1B for suppressing the collection of activity data by an operating system, according to one particular embodiment. As illustrated in FIG. 1C, the activity data synchronization service 120 can determine the activity data 106 to be transmitted to each of the computing devices 100A-100N in order for the activity data 106 stored on each of the computing devices 100A-100N to be synchronized (i.e. the same on each of the devices).

Once the activity data synchronization service 120 has determined the activity data 106 to be transmitted to each of the computing devices 100A-100N, the appropriate activity data 106 is transmitted to each of the computing devices 106. The computing devices 100B and 100N can then provide an activity history UI 102 that includes the activity data 106 in the manner described above with regard to FIG. 1A. The computing devices 100B and 100N can also provide an activity data collection preferences UI 128, such as that described above with regard to FIG. 1A and further below with regard to FIG. 2, for specifying whether activity data 106 is to be collected on those devices. In one embodiment, a single indication through the UI 128 will suppress the collection of activity data 106 on all of the devices 100 associated with a user 104.

Figure 2:
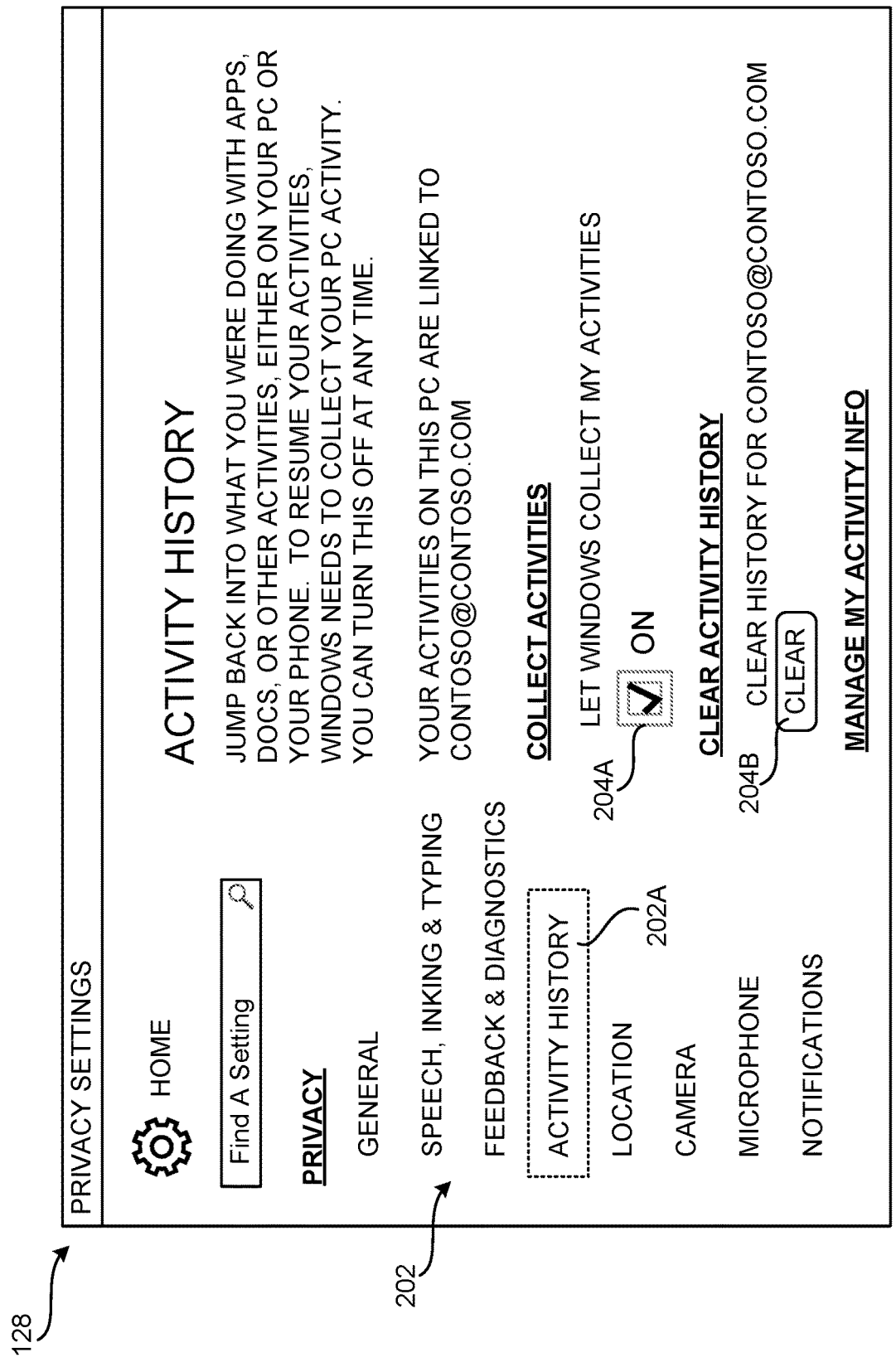
FIG. 2 is a user interface diagram showing aspects of an illustrative user interface disclosed herein for receiving preferences relating to suppressing the collection of activity data by an operating system, according to one particular embodiment.

FIG. 2 is a user interface diagram showing aspects of an illustrative user activity data collection preferences UI 128 disclosed herein for receiving preferences relating to the suppression of the collection of activity data 106 by an operating system 112, according to one particular embodiment. As shown in FIG. 2, the UI 128 can include menu items 202 that allow a user to define privacy settings. One menu item 202A causes the UI 128 to be presented. As discussed above, the UI 128 enables a user 104 to specify activity data collection preferences 126 that define whether activity data 106 is to be collected by the operating system 112 or not.

As shown in FIG. 2, the UI 128 includes a UI control 204A which, when selected, will define activity data collection preferences 126 that cause the API 110 to discard activity data 106 received from the applications 108. In this manner, activity data 106 provided by the applications 108 is not stored in the data store 114 or other location.

Another selection of the UI control 204A in the UI 128 will define activity data collection preferences 126 that instruct the operating system 112 and the API 110 to resume collection of activity data 106 provided by the applications 108. Following resumption of the collection of activity data 106, the API 110 will store activity data 106 provided by applications 108 in the data store 114 or in another suitable location.

In some embodiments, the UI 128 also includes another UI control 204B which, when selected, will cause the OS 112 or the API 110 to remove previously stored activity data 106 from the data store 114 or other location. In this manner, a user 104 can delete their entire activity history, thereby maintaining their privacy.

It is to be appreciated that the UI 128, UI controls 204A and 205B, and arrangement of the UI controls 204A and 204B shown in FIG. 2 are merely illustrative. Other types of UIs, UI controls, and arrangements of UI controls can be utilized in other embodiments to enable similar functionality. The functionality disclosed herein can also be utilized with other types of user interfaces, such as voice-driven or virtual reality user interfaces.

Figure 3:
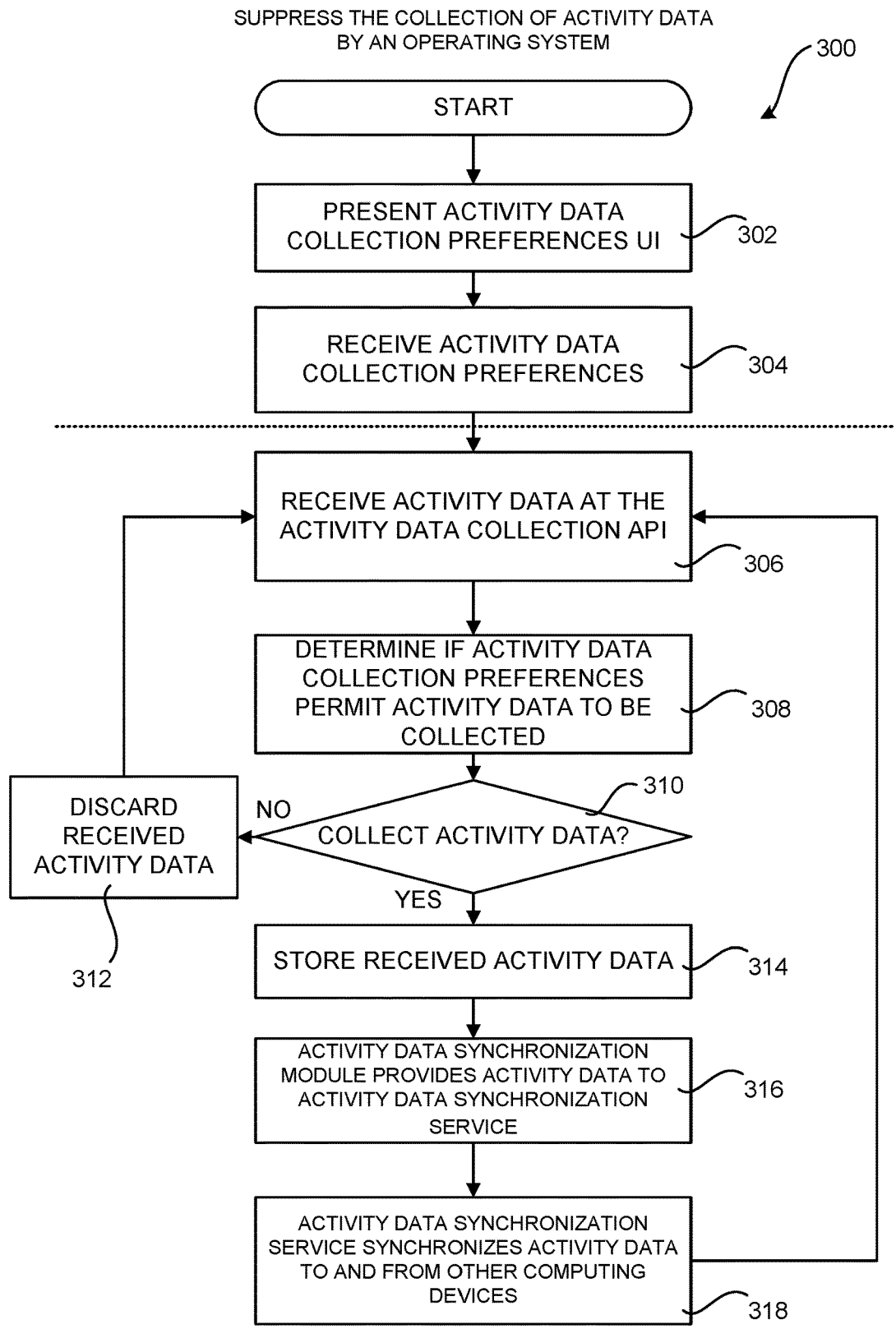
FIG. 3 is a flow diagram showing a routine that illustrates aspects of the operation of the computing devices shown in FIGS. 1A-1C for suppressing the collection of activity data by an operating system, according to one embodiment disclosed herein.

FIG. 3 is a flow diagram showing a routine 300 that illustrates aspects of the operation of the computing devices 100 shown in FIGS. 1A-1C for suppressing the collection of activity data 106 by an operating system 112, according to one embodiment disclosed herein. It should be appreciated that the logical operations described herein with regard to FIG. 3, and the other FIGS., can be implemented (1) as a sequence of computer implemented acts or program modules running on a computing system and/or (2) as interconnected machine logic circuits or circuit modules within the computing system.

The particular implementation of the technologies disclosed herein is a matter of choice dependent on the performance and other requirements of the computing system. Accordingly, the logical operations described herein are referred to variously as states, operations, structural devices, acts, or modules. These states, operations, structural devices, acts and modules can be implemented in software, in firmware, in special purpose digital logic, and any combination thereof. It should also be appreciated that more or fewer operations can be performed than shown in the FIGS. and described herein. These operations can also be performed in a different order than those described herein.

The routine 300 begins at operation 302, where a computing system 100 presents the activity data collection preferences UI 128 on a connected display. The routine 300 then proceeds to operation 304, where the activity data collection preferences 126 are received from a user 104 via the activity data collection preferences UI 128. The activity data collection preferences 126 are provided to the API 112.

From operation 304, the routine 300 proceeds to operation 306, where the API 112 receives activity data 106 from one of the applications 108. In response to receiving the activity data 106, the routine 300 proceeds to operation 308, where the API 112 determines, based upon the activity data collection preferences 126, whether activity data 106 is to be collected. If activity data 106 is not to be collected, the routine 300 proceeds from operation 310 to operation 312, where the API 112 discards the activity data 106 received at operation 306. The activity data 112 is not stored in the data store 114 or elsewhere. The routine 300 then proceeds back to operation 306, where additional activity data 106 can be processed in a similar manner.

If activity data 106 is to be collected, the routine 300 proceeds from operation 310 to operation 314, where the API 112 stores the activity data 106 received at operation 306 in the data store 114 or another suitable location. The routine 300 then continues to operation 316, where the activity data 106 received at operation 306 is provided to the activity data synchronization module 118 provides the activity data 106 received at operation 306 to the activity data synchronization service 120. The routine 300 then proceeds from operation 316 to operation 318, where the activity data synchronization service 120 synchronizes the activity data 106 with other computing devices (e.g., computing devices 100B-100N) associated with the same user. The routine 300 then proceeds back to operation 306, where additional activity data 106 can be processed in a similar manner.

Figure 4:
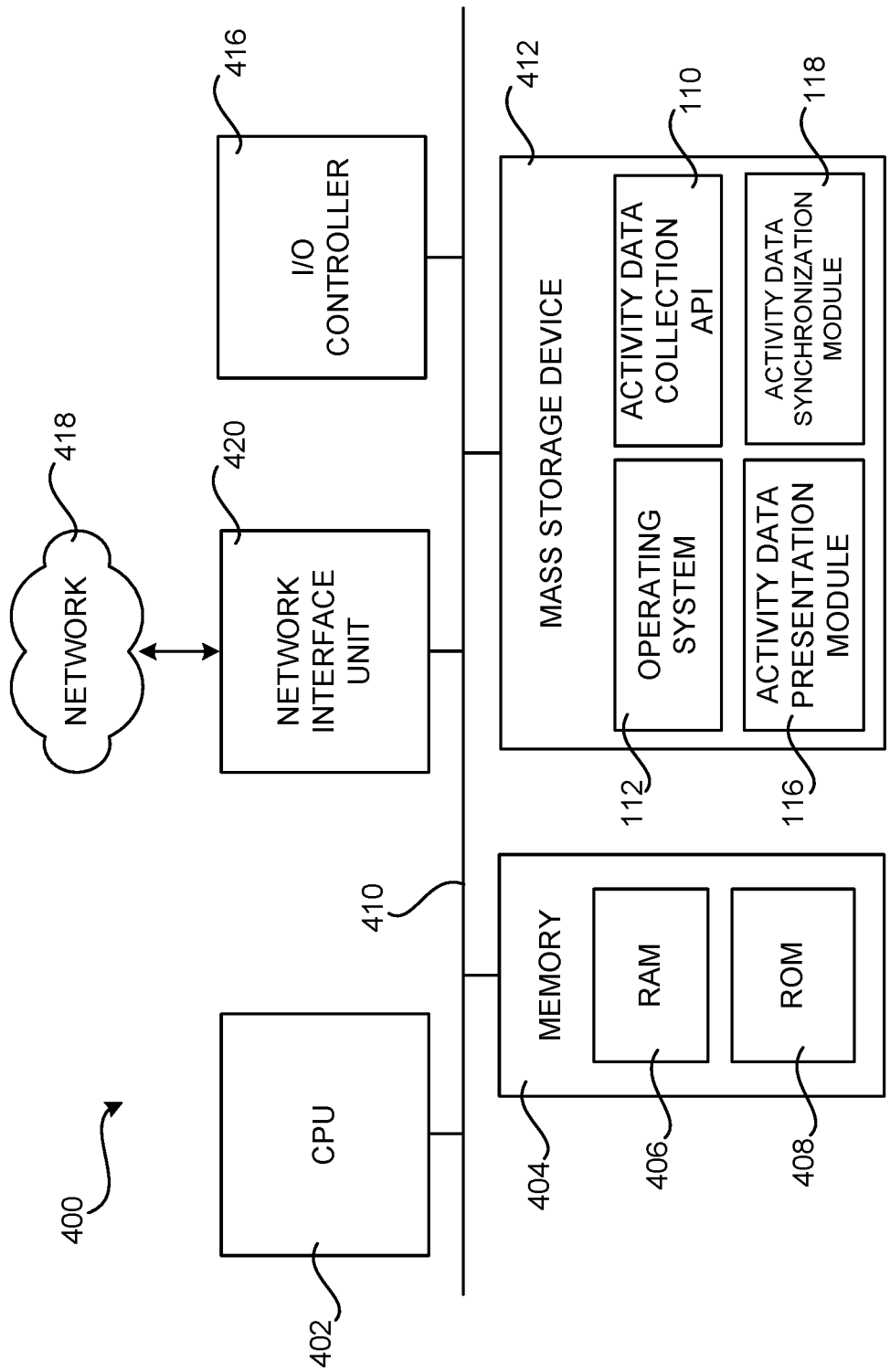
FIG. 4 is a computer architecture diagram showing an illustrative computer hardware and software architecture for a computing device, such as the computing devices shown in FIGS. 1A-1C, that is capable of implementing aspects of the technologies presented herein.

FIG. 4 is a computer architecture diagram that shows an architecture for a computer 400 capable of executing the software components described herein. The architecture illustrated in FIG. 4 is an architecture for a server computer, mobile phone, an e-reader, a smartphone, a desktop computer, a netbook computer, a tablet computer, a laptop computer, or another type of computing device suitable for executing the software components presented herein.

In this regard, it should be appreciated that the computer 400 shown in FIG. 4 can be utilized to implement a computing device capable of executing any of the software components presented herein. For example, and without limitation, the computing architecture described with reference to FIG. 4 can be utilized to implement the computing devices 100A-100N, illustrated in FIGS. 1A-1C and described above, which are capable of executing the OS 112, the applications 108, the activity data collection API 110, the activity data presentation module 116, the activity data synchronization module 118, the activity data synchronization service 120, and/or any of the other software components described above.

The computer 400 illustrated in FIG. 4 includes a central processing unit 402 ("CPU"), a system memory 404, including a random-access memory 406 ("RAM") and a read-only memory ("ROM") 408, and a system bus 410 that couples the memory 404 to the CPU 402. A basic input/output system ("BIOS" or "firmware") containing the basic routines that help to transfer information between elements within the computer 400, such as during startup, is stored in the ROM 408. The computer 400 further includes a mass storage device 412 for storing an operating system 112 and one or more programs including, but not limited to, the activity data collection API 110, the activity data presentation module 116, and the activity data synchronization module 118. The mass storage device 412 can also be configured to store other types of programs and data.

The mass storage device 412 is connected to the CPU 402 through a mass storage controller (not shown) connected to the bus 410. The mass storage device 412 and its associated computer readable media provide non-volatile storage for the computer 400. Although the description of computer readable media contained herein refers to a mass storage device, such as a hard disk, CD-ROM drive, DVD-ROM drive, or USB storage key, it should be appreciated by those skilled in the art that computer readable media can be any available computer storage media or communication media that can be accessed by the computer 400.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer readable media.

By way of example, and not limitation, computer storage media can include volatile and non-volatile, removable and non-removable media implemented in any method or technology for storage of information such as computer readable instructions, data structures, program modules or other data. For example, computer storage media includes, but is not limited to, RAM, ROM, EPROM, EEPROM, flash memory or other solid-state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computer 400. For purposes of the claims, the phrase "computer storage medium," and variations thereof, does not include waves or signals per se or communication media.

According to various configurations, the computer 400 can operate in a networked environment using logical connections to remote computers through a network such as the network 418. The computer 400 can connect to the network 418 through a network interface unit 420 connected to the bus 410. It should be appreciated that the network interface unit 420 can also be utilized to connect to other types of networks and remote computer systems. The computer 400 can also include an input/output controller 416 for receiving and processing input from a number of other devices, including a keyboard, mouse, touch input, or electronic stylus (not shown in FIG. 4). Similarly, the input/output controller 416 can provide output, such as the activity data collection preferences UI 128 and the activity history UI 102, to a display screen or other type of output device (also not shown in FIG. 4).

It should be appreciated that the software components described herein, such as the activity data collection API 110, the activity data presentation module 116, and the activity data synchronization module 118, when loaded into the CPU 402 and executed, can transform the CPU 402 and the overall computer 400 from a general-purpose computing system into a special-purpose computing system customized to facilitate the functionality presented herein. The CPU 402 can be constructed from any number of transistors or other discrete circuit elements, which can individually or collectively assume any number of states. More specifically, the CPU 402 can operate as a finite-state machine, in response to executable instructions contained within the software modules disclosed herein. These computer-executable instructions can transform the CPU 402 by specifying how the CPU 402 transitions between states, thereby transforming the transistors or other discrete hardware elements constituting the CPU 402.

Encoding the software modules presented herein can also transform the physical structure of the computer readable media presented herein. The specific transformation of physical structure depends on various factors, in different implementations of this description. Examples of such factors include, but are not limited to, the technology used to implement the computer readable media, whether the computer readable media is characterized as primary or secondary storage, and the like. For example, if the computer readable media is implemented as semiconductor-based memory, the software disclosed herein can be encoded on the computer readable media by transforming the physical state of the semiconductor memory. For instance, the software can transform the state of transistors, capacitors, or other discrete circuit elements constituting the semiconductor memory. The software can also transform the physical state of such components in order to store data thereupon.

As another example, the computer readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 400 in order to store and execute the software components presented herein. It also should be appreciated that the architecture shown in FIG. 4 for the computer 400, or a similar architecture, can be utilized to implement other types of computing devices, including hand-held computers, embedded computer systems, mobile devices such as smartphones and tablets, and other types of computing devices known to those skilled in the art. It is also contemplated that the computer 400 might not include all of the components shown in FIG. 4, can include other components that are not explicitly shown in FIG. 4, or can utilize an architecture completely different than that shown in FIG. 4.

Figure 5:
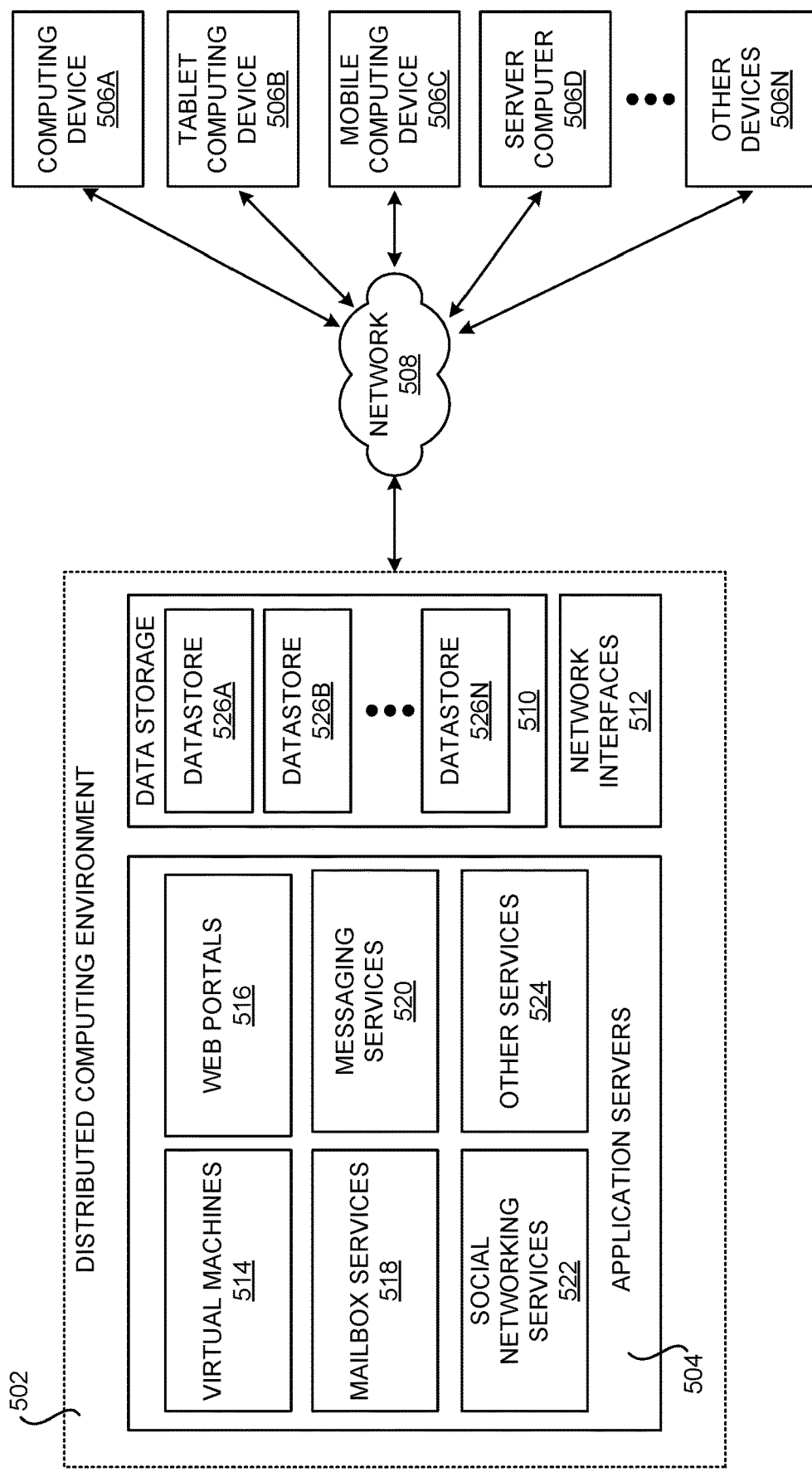
FIG. 5 is a network diagram illustrating a distributed computing environment capable of implementing aspects of the technologies presented herein.

FIG. 5 shows aspects of an illustrative distributed computing environment 502 in which the software components described herein can be executed. Thus, the distributed computing environment 502 illustrated in FIG. 5 can be used to execute program code, such as the activity data synchronization service 120, capable of providing the functionality described above with respect to FIGS. 1A-1C, and/or any of the other software components described herein.

According to various implementations, the distributed computing environment 502 operates on, in communication with, or as part of a network 508. One or more client devices 506A-506N (hereinafter referred to collectively and/or generically as "devices 506") can communicate with the distributed computing environment 502 via the network 508 and/or other connections (not illustrated in FIG. 5).

In the illustrated configuration, the devices 506 include: a computing device 506A such as a laptop computer, a desktop computer, or other computing device; a "slate" or tablet computing device ("tablet computing device") 506B; a mobile computing device 506C such as a mobile telephone, a smartphone, or other mobile computing device; a server computer 506D; and/or other devices 506N. It should be understood that any number of devices 506 can communicate with the distributed computing environment 502. Two example computing architectures for the devices 506 are illustrated and described herein with reference to FIGS. 4 and 6. It should be understood that the illustrated clients 506 and computing architectures illustrated and described herein are illustrative, and should not be construed as being limited in any way.

In the illustrated configuration, the distributed computing environment 502 includes application servers 504, data storage 510, and one or more network interfaces 512. According to various implementations, the functionality of the application servers 504 can be provided by one or more server computers that are executing as part of, or in communication with, the network 508. The application servers 504 can host various services such as virtual machines, portals, and/or other resources. In the illustrated configuration, the application servers 504 host one or more virtual machines 514 for hosting applications, such as program components for implementing the activity data synchronization service 120, or other functionality. It should be understood that this configuration is illustrative and should not be construed as being limiting in any way. The application servers 504 might also host or provide access to one or more web portals, link pages, websites, and/or other information ("web portals") 516.

According to various implementations, the application servers 504 also include one or more mailbox services 518 and one or more messaging services 520. The mailbox services 518 can include electronic mail ("email") services. The mailbox services 518 can also include various personal information management ("PIM") services including, but not limited to, calendar services, contact management services, collaboration services, and/or other services. The messaging services 520 can include, but are not limited to, instant messaging ("IM") services, chat services, forum services, and/or other communication services.

The application servers 504 can also include one or more social networking services 522. The social networking services 522 can provide various types of social networking services including, but not limited to, services for sharing or posting status updates, instant messages, links, photos, videos, and/or other information, services for commenting or displaying interest in articles, products, blogs, or other resources, and/or other services. In some configurations, the social networking services 522 are provided by or include the FACEBOOK social networking service, the LINKEDIN professional networking service, the FOURSQUARE geographic networking service, and the like. In other configurations, the social networking services 522 are provided by other services, sites, and/or providers that might be referred to as "social networking providers." For example, some websites allow users to interact with one another via email, chat services, and/or other means during various activities and/or contexts such as reading published articles, commenting on goods or services, publishing, collaboration, gaming, and the like. Other services are possible and are contemplated.

The social network services 522 can include commenting, blogging, and/or microblogging services. Examples of such services include, but are not limited to, the YELP commenting service, the KUDZU review service, the OFFICETALK enterprise microblogging service, the TWITTER messaging service, and/or other services. It should be appreciated that the above lists of services are not exhaustive and that numerous additional and/or alternative social networking services 522 are not mentioned herein for the sake of brevity. As such, the configurations described above are illustrative, and should not be construed as being limited in any way.

As also shown in FIG. 5, the application servers 504 can also host other services, applications, portals, and/or other resources ("other services") 524. These services can include, but are not limited to, streaming video services like the NETFLIX streaming video service and productivity services such as the GMAIL email service from GOOGLE INC. It thus can be appreciated that activities performed by users of the distributed computing environment 502 can include various mailbox, messaging, social networking, group conversation, productivity, entertainment, and other types of activities. Use of these services, and others, can be detected and used to customize the operation of a computing device utilizing the technologies disclosed herein.

As mentioned above, the distributed computing environment 502 can include data storage 510. According to various implementations, the functionality of the data storage 510 is provided by one or more databases operating on, or in communication with, the network 508. The functionality of the data storage 510 can also be provided by one or more server computers configured to host data for the distributed computing environment 502. The data storage 510 can include, host, or provide one or more real or virtual datastores 526A-526N (hereinafter referred to collectively and/or generically as "datastores 526"). The datastores 526 are configured to host data used or created by the application servers 504 and/or other data.

The distributed computing environment 502 can communicate with, or be accessed by, the network interfaces 512. The network interfaces 512 can include various types of network hardware and software for supporting communications between two or more computing devices including, but not limited to, the devices 506 and the application servers 504. It should be appreciated that the network interfaces 512 can also be utilized to connect to other types of networks and/or computer systems.

It should be understood that the distributed computing environment 502 described herein can implement any aspects of the software elements described herein with any number of virtual computing resources and/or other distributed computing functionality that can be configured to execute any aspects of the software components disclosed herein. It should also be understood that the devices 506 can also include real or virtual machines including, but not limited to, server computers, web servers, personal computers, mobile computing devices, smartphones, and/or other devices. As such, various implementations of the technologies disclosed herein enable any device configured to access the distributed computing environment 502 to utilize the functionality described herein.

Figure 6:
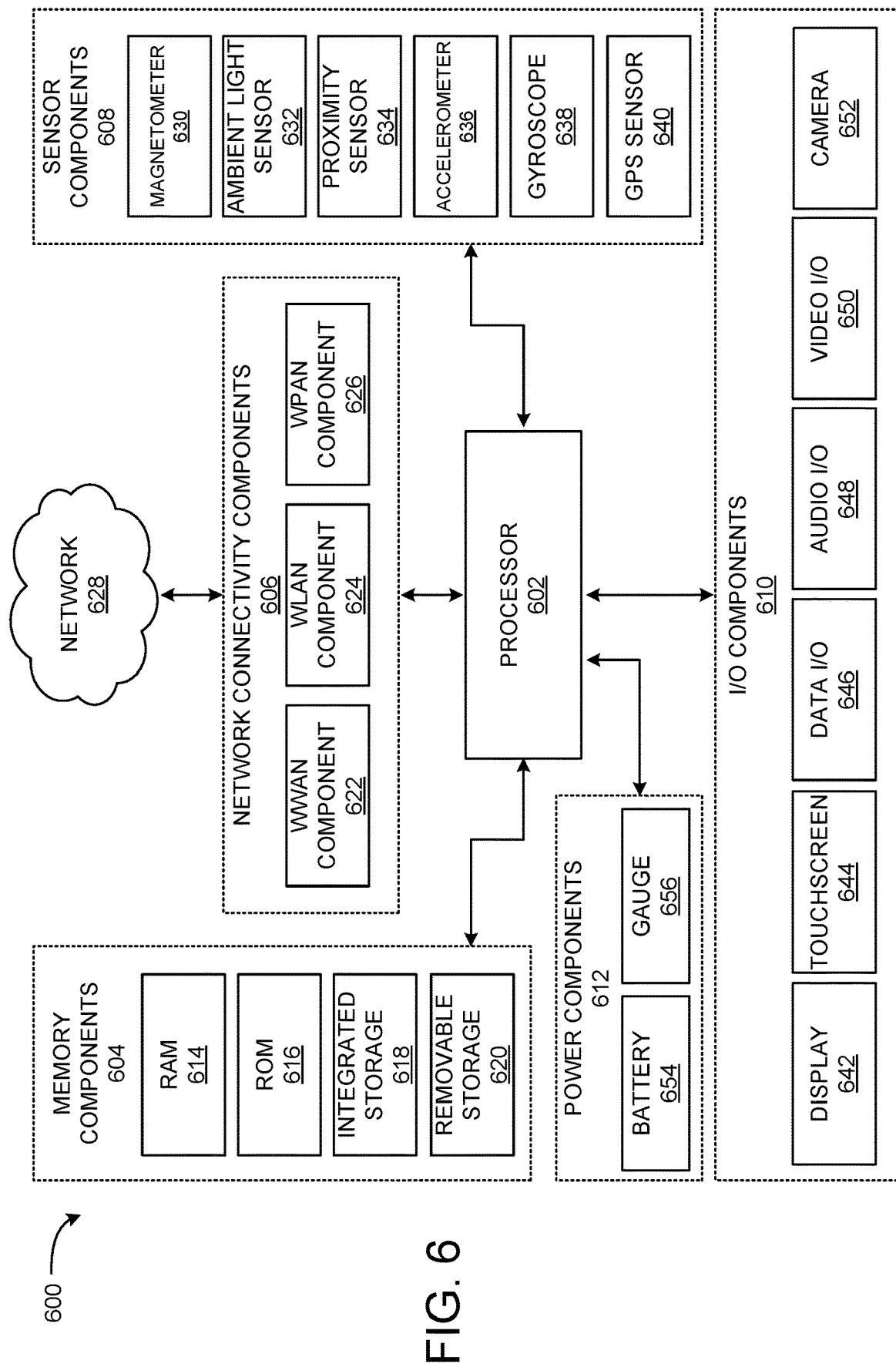
FIG. 6 is a computer architecture diagram illustrating a computing device architecture for a computing device, such as the computing devices shown in FIGS. 1A-1C, that is capable of implementing aspects of the technologies presented herein.

Turning now to FIG. 6, an illustrative computing device architecture 600 will be described for a computing device, such as the computing devices 100A-100N, that is capable of executing the various software components described herein. The computing device architecture 600 is applicable to computing devices that facilitate mobile computing due, in part, to form factor, wireless connectivity, and/or battery-powered operation. In some configurations, the computing devices include, but are not limited to, mobile telephones, tablet devices, slate devices, portable video game devices, and the like.

The computing device architecture 600 is also applicable to any of the devices 506 shown in FIG. 5. Furthermore, aspects of the computing device architecture 600 are applicable to traditional desktop computers, portable computers (e.g., laptops, notebooks, ultra-portables, and netbooks), server computers, and other computer devices, such as those described herein. For example, the single touch and multi-touch aspects disclosed herein below can be applied to desktop, laptop, convertible, or tablet computer devices that utilize a touchscreen or some other touch-enabled device, such as a touch-enabled track pad or touch-enabled mouse. The computing device architecture 600 can also be utilized to implement the computing devices 100A-100N, and/or other types of computing devices for implementing or consuming the functionality described herein.

The computing device architecture 600 illustrated in FIG. 6 includes a processor 602, memory components 604, network connectivity components 606, sensor components 608, input/output components 610, and power components 612. In the illustrated configuration, the processor 602 is in communication with the memory components 604, the network connectivity components 606, the sensor components 608, the input/output ("I/O") components 610, and the power components 612. Although no connections are shown between the individual components illustrated in FIG. 6, the components can be connected electrically in order to interact and carry out device functions. In some configurations, the components are arranged so as to communicate via one or more busses (not shown).

The processor 602 includes one or more CPU cores configured to process data, execute computer-executable instructions of one or more application programs and to communicate with other components of the computing device architecture 600 in order to perform various functionality described herein. The processor 602 can be utilized to execute aspects of the software components presented herein and, particularly, those that utilize, at least in part, a touch-enabled input.

In some configurations, the processor 602 includes a graphics processing unit ("GPU") configured to accelerate operations performed by the CPU, including, but not limited to, operations performed by executing general-purpose scientific and engineering computing applications, as well as graphics-intensive computing applications such as high-resolution video (e.g., 720P, 1080P, 4K, and greater), video games, 3D modeling applications, and the like. In some configurations, the processor 602 is configured to communicate with a discrete GPU (not shown). In any case, the CPU and GPU can be configured in accordance with a co-processing CPU/GPU computing model, wherein the sequential part of an application executes on the CPU and the computationally intensive part is accelerated by the GPU.

In some configurations, the processor 602 is, or is included in, a system-on-chip ("SoC") along with one or more of the other components described herein below. For example, the SoC can include the processor 602, a GPU, one or more of the network connectivity components 606, and one or more of the sensor components 608. In some configurations, the processor 602 is fabricated, in part, utilizing a package-on-package ("PoP") integrated circuit packaging technique. Moreover, the processor 602 can be a single core or multi-core processor.

The processor 602 can be created in accordance with an ARM architecture, available for license from ARM HOLDINGS of Cambridge, United Kingdom. Alternatively, the processor 602 can be created in accordance with an x86 architecture, such as is available from INTEL CORPORATION of Mountain View, Calif. and others. In some configurations, the processor 602 is a SNAPDRAGON SoC, available from QUALCOMM of San Diego, Calif., a TEGRA SoC, available from NVIDIA of Santa Clara, Calif., a HUMMINGBIRD SoC, available from SAMSUNG of Seoul, South Korea, an Open Multimedia Application Platform ("OMAP") SoC, available from TEXAS INSTRUMENTS of Dallas, Tex., a customized version of any of the above SoCs, or a proprietary SoC.

The memory components 604 include a RAM 614, a ROM 616, an integrated storage memory ("integrated storage") 618, and a removable storage memory ("removable storage") 620. In some configurations, the RAM 614 or a portion thereof, the ROM 616 or a portion thereof, and/or some combination of the RAM 614 and the ROM 616 is integrated in the processor 602. In some configurations, the ROM 616 is configured to store a firmware, an operating system or a portion thereof (e.g., operating system kernel), and/or a bootloader to load an operating system kernel from the integrated storage 618 or the removable storage 620.

The integrated storage 618 can include a solid-state memory, a hard disk, or a combination of solid-state memory and a hard disk. The integrated storage 618 can be soldered or otherwise connected to a logic board upon which the processor 602 and other components described herein might also be connected. As such, the integrated storage 618 is integrated in the computing device. The integrated storage 618 can be configured to store an operating system or portions thereof, application programs, data, and other software components described herein.

The removable storage 620 can include a solid-state memory, a hard disk, or a combination of solid-state memory and a hard disk. In some configurations, the removable storage 620 is provided in lieu of the integrated storage 618. In other configurations, the removable storage 620 is provided as additional optional storage. In some configurations, the removable storage 620 is logically combined with the integrated storage 618 such that the total available storage is made available and shown to a user as a total combined capacity of the integrated storage 618 and the removable storage 620.

The removable storage 620 is configured to be inserted into a removable storage memory slot (not shown) or other mechanism by which the removable storage 620 is inserted and secured to facilitate a connection over which the removable storage 620 can communicate with other components of the computing device, such as the processor 602. The removable storage 620 can be embodied in various memory card formats including, but not limited to, PC card, COMPACTFLASH card, memory stick, secure digital ("SD"), miniSD, microSD, universal integrated circuit card ("UICC") (e.g., a subscriber identity module ("SIM") or universal SIM ("USIM")), a proprietary format, or the like.

It can be understood that one or more of the memory components 604 can store an operating system. According to various configurations, the operating system includes, but is not limited to, the WINDOWS operating system from MICROSOFT CORPORATION, the IOS operating system from APPLE INC. of Cupertino, Calif., and ANDROID operating system from GOOGLE INC. of Mountain View, Calif. Other operating systems can also be utilized.

The network connectivity components 606 include a wireless wide area network component ("WWAN component") 622, a wireless local area network component ("WLAN component") 624, and a wireless personal area network component ("WPAN component") 626. The network connectivity components 606 facilitate communications to and from a network 628, which can be a WWAN, a WLAN, or a WPAN. Although a single network 628 is illustrated, the network connectivity components 606 can facilitate simultaneous communication with multiple networks. For example, the network connectivity components 606 can facilitate simultaneous communications with multiple networks via one or more of a WWAN, a WLAN, or a WPAN.

The network 628 can be a WWAN, such as a mobile telecommunications network utilizing one or more mobile telecommunications technologies to provide voice and/or data services to a computing device utilizing the computing device architecture 600 via the WWAN component 622. The mobile telecommunications technologies can include, but are not limited to, Global System for Mobile communications ("GSM"), Code Division Multiple Access ("CDMA") ONE, CDMA2000, Universal Mobile Telecommunications System ("UMTS"), Long Term Evolution ("LTE"), and Worldwide Interoperability for Microwave Access ("WiMAX").

Moreover, the network 628 can utilize various channel access methods (which might or might not be used by the aforementioned standards) including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Space Division Multiple Access ("SDMA"), and the like. Data communications can be provided using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and various other current and future wireless data access standards. The network 628 can be configured to provide voice and/or data communications with any combination of the above technologies. The network 628 can be configured or adapted to provide voice and/or data communications in accordance with future generation technologies.

In some configurations, the WWAN component 622 is configured to provide dual-multi-mode connectivity to the network 628. For example, the WWAN component 622 can be configured to provide connectivity to the network 628, wherein the network 628 provides service via GSM and UMTS technologies, or via some other combination of technologies. Alternatively, multiple WWAN components 622 can be utilized to perform such functionality, and/or provide additional functionality to support other non-compatible technologies (i.e., incapable of being supported by a single WWAN component). The WWAN component 622 can facilitate similar connectivity to multiple networks (e.g., a UMTS network and an LTE network).

The network 628 can be a WLAN operating in accordance with one or more Institute of Electrical and Electronic Engineers ("IEEE") 104.11 standards, such as IEEE 104.11a, 104.11b, 104.11g, 104.11n, and/or a future 104.11 standard (referred to herein collectively as WI-FI). Draft 104.11 standards are also contemplated. In some configurations, the WLAN is implemented utilizing one or more wireless WI-FI access points. In some configurations, one or more of the wireless WI-FI access points are another computing device with connectivity to a WWAN that are functioning as a WI-FI hotspot. The WLAN component 624 is configured to connect to the network 628 via the WI-FI access points. Such connections can be secured via various encryption technologies including, but not limited, WI-FI Protected Access ("WPA"), WPA2, Wired Equivalent Privacy ("WEP"), and the like.

The network 628 can be a WPAN operating in accordance with Infrared Data Association ("IrDA"), BLUETOOTH, wireless Universal Serial Bus ("USB"), Z-Wave, ZIGBEE, or some other short-range wireless technology. In some configurations, the WPAN component 626 is configured to facilitate communications with other devices, such as peripherals, computers, or other computing devices via the WPAN.

The sensor components 608 include a magnetometer 630, an ambient light sensor 632, a proximity sensor 634, an accelerometer 636, a gyroscope 638, and a Global Positioning System sensor ("GPS sensor") 640. It is contemplated that other sensors, such as, but not limited to, temperature sensors or shock detection sensors, might also be incorporated in the computing device architecture 600.

The magnetometer 630 is configured to measure the strength and direction of a magnetic field. In some configurations, the magnetometer 630 provides measurements to a compass application program stored within one of the memory components 604 in order to provide a user with accurate directions in a frame of reference including the cardinal directions, north, south, east, and west. Similar measurements can be provided to a navigation application program that includes a compass component. Other uses of measurements obtained by the magnetometer 630 are contemplated.

The ambient light sensor 632 is configured to measure ambient light. In some configurations, the ambient light sensor 632 provides measurements to an application program stored within one the memory components 604 in order to automatically adjust the brightness of a display (described below) to compensate for low light and bright light environments. Other uses of measurements obtained by the ambient light sensor 632 are contemplated.

The proximity sensor 634 is configured to detect the presence of an object or thing in proximity to the computing device without direct contact. In some configurations, the proximity sensor 634 detects the presence of a user's body (e.g., the user's face) and provides this information to an application program stored within one of the memory components 604 that utilizes the proximity information to enable or disable some functionality of the computing device. For example, a telephone application program can automatically disable a touchscreen (described below) in response to receiving the proximity information so that the user's face does not inadvertently end a call or enable/disable other functionality within the telephone application program during the call. Other uses of proximity as detected by the proximity sensor 634 are contemplated.

The accelerometer 636 is configured to measure proper acceleration. In some configurations, output from the accelerometer 636 is used by an application program as an input mechanism to control some functionality of the application program. In some configurations, output from the accelerometer 636 is provided to an application program for use in switching between landscape and portrait modes, calculating coordinate acceleration, or detecting a fall. Other uses of the accelerometer 636 are contemplated.

The gyroscope 638 is configured to measure and maintain orientation. In some configurations, output from the gyroscope 638 is used by an application program as an input mechanism to control some functionality of the application program. For example, the gyroscope 638 can be used for accurate recognition of movement within a 3D environment of a video game application or some other application. In some configurations, an application program utilizes output from the gyroscope 638 and the accelerometer 636 to enhance user input operations. Other uses of the gyroscope 638 are contemplated.

The GPS sensor 640 is configured to receive signals from GPS satellites for use in calculating a location. The location calculated by the GPS sensor 640 can be used by any application program that requires or benefits from location information. For example, the location calculated by the GPS sensor 640 can be used with a navigation application program to provide directions from the location to a destination or directions from the destination to the location. Moreover, the GPS sensor 640 can be used to provide location information to an external location-based service, such as E911 service. The GPS sensor 640 can obtain location information generated via WI-FI, WIMAX, and/or cellular triangulation techniques utilizing one or more of the network connectivity components 606 to aid the GPS sensor 640 in obtaining a location fix. The GPS sensor 640 can also be used in Assisted GPS ("A-GPS") systems.

The I/O components 610 include a display 642, a touchscreen 644, a data I/O interface component ("data I/O") 646, an audio I/O interface component ("audio I/O") 648, a video I/O interface component ("video I/O") 650, and a camera 652. In some configurations, the display 642 and the touchscreen 644 are combined. In some configurations two or more of the data I/O component 646, the audio I/O component 648, and the video I/O component 650 are combined. The I/O components 610 can include discrete processors configured to support the various interfaces described below, or might include processing functionality built-in to the processor 602.

The display 642 is an output device configured to present information in a visual form. In particular, the display 642 can present graphical user interface ("GUI") elements, text, images, video, notifications, virtual buttons, virtual keyboards, messaging data, Internet content, device status, time, date, calendar data, preferences, map information, location information, and any other information that is capable of being presented in a visual form. In some configurations, the display 642 is a liquid crystal display ("LCD") utilizing any active or passive matrix technology and any backlighting technology (if used). In some configurations, the display 642 is an organic light emitting diode ("OLED") display. Other display types are contemplated.

The touchscreen 644 is an input device configured to detect the presence and location of a touch. The touchscreen 644 can be a resistive touchscreen, a capacitive touchscreen, a surface acoustic wave touchscreen, an infrared touchscreen, an optical imaging touchscreen, a dispersive signal touchscreen, an acoustic pulse recognition touchscreen, or can utilize any other touchscreen technology. In some configurations, the touchscreen 644 is incorporated on top of the display 642 as a transparent layer to enable a user to use one or more touches to interact with objects or other information presented on the display 642. In other configurations, the touchscreen 644 is a touch pad incorporated on a surface of the computing device that does not include the display 642. For example, the computing device can have a touchscreen incorporated on top of the display 642 and a touch pad on a surface opposite the display 642.

In some configurations, the touchscreen 644 is a single-touch touchscreen. In other configurations, the touchscreen 644 is a multi-touch touchscreen. In some configurations, the touchscreen 644 is configured to detect discrete touches, single touch gestures, and/or multi-touch gestures. These are collectively referred to herein as "gestures" for convenience. Several gestures will now be described. It should be understood that these gestures are illustrative and are not intended to limit the scope of the appended claims. Moreover, the described gestures, additional gestures, and/or alternative gestures can be implemented in software for use with the touchscreen 644. As such, a developer can create gestures that are specific to a particular application program.

In some configurations, the touchscreen 644 supports a tap gesture in which a user taps the touchscreen 644 once on an item presented on the display 642. The tap gesture can be used for various reasons including, but not limited to, opening or launching whatever the user taps, such as a graphical icon. In some configurations, the touchscreen 644 supports a double tap gesture in which a user taps the touchscreen 644 twice on an item presented on the display 642. The double tap gesture can be used for various reasons including, but not limited to, zooming in or zooming out in stages. In some configurations, the touchscreen 644 supports a tap and hold gesture in which a user taps the touchscreen 644 and maintains contact for at least a pre-defined time. The tap and hold gesture can be used for various reasons including, but not limited to, opening a context-specific menu.

In some configurations, the touchscreen 644 supports a pan gesture in which a user places a finger on the touchscreen 644 and maintains contact with the touchscreen 644 while moving the finger on the touchscreen 644. The pan gesture can be used for various reasons including, but not limited to, moving through screens, images, or menus at a controlled rate. Multiple finger pan gestures are also contemplated. In some configurations, the touchscreen 644 supports a flick gesture in which a user swipes a finger in the direction the user wants the screen to move. The flick gesture can be used for various reasons including, but not limited to, scrolling horizontally or vertically through menus or pages. In some configurations, the touchscreen 644 supports a pinch and stretch gesture in which a user makes a pinching motion with two fingers (e.g., thumb and forefinger) on the touchscreen 644 or moves the two fingers apart. The pinch and stretch gesture can be used for various reasons including, but not limited to, zooming gradually in or out of a website, map, or picture.

Although the gestures described above have been presented with reference to the use of one or more fingers for performing the gestures, other appendages such as toes or objects such as styluses can be used to interact with the touchscreen 644. As such, the above gestures should be understood as being illustrative and should not be construed as being limiting in any way.

The data I/O interface component 646 is configured to facilitate input of data to the computing device and output of data from the computing device. In some configurations, the data I/O interface component 646 includes a connector configured to provide wired connectivity between the computing device and a computer system, for example, for synchronization operation purposes. The connector can be a proprietary connector or a standardized connector such as USB, micro-USB, mini-USB, USB-C, or the like. In some configurations, the connector is a dock connector for docking the computing device with another device such as a docking station, audio device (e.g., a digital music player), or video device.

The audio I/O interface component 648 is configured to provide audio input and/or output capabilities to the computing device. In some configurations, the audio I/O interface component 648 includes a microphone configured to collect audio signals. In some configurations, the audio I/O interface component 648 includes a headphone jack configured to provide connectivity for headphones or other external speakers. In some configurations, the audio interface component 648 includes a speaker for the output of audio signals. In some configurations, the audio I/O interface component 648 includes an optical audio cable out.

The video I/O interface component 650 is configured to provide video input and/or output capabilities to the computing device. In some configurations, the video I/O interface component 650 includes a video connector configured to receive video as input from another device (e.g., a video media player such as a DVD or BLU-RAY player) or send video as output to another device (e.g., a monitor, a television, or some other external display). In some configurations, the video I/O interface component 650 includes a High-Definition Multimedia Interface ("HDMI"), mini-HDMI, micro-HDMI, DisplayPort, or proprietary connector to input/output video content. In some configurations, the video I/O interface component 650 or portions thereof is combined with the audio I/O interface component 648 or portions thereof.

The camera 652 can be configured to capture still images and/or video. The camera 652 can utilize a charge coupled device ("CCD") or a complementary metal oxide semiconductor ("CMOS") image sensor to capture images. In some configurations, the camera 652 includes a flash to aid in taking pictures in low-light environments. Settings for the camera 652 can be implemented as hardware or software buttons.

Although not illustrated, one or more hardware buttons can also be included in the computing device architecture 600. The hardware buttons can be used for controlling some operational aspect of the computing device. The hardware buttons can be dedicated buttons or multi-use buttons. The hardware buttons can be mechanical or sensor-based.

The illustrated power components 612 include one or more batteries 654, which can be connected to a battery gauge 656. The batteries 654 can be rechargeable or disposable. Rechargeable battery types include, but are not limited to, lithium polymer, lithium ion, nickel cadmium, and nickel metal hydride. Each of the batteries 654 can be made of one or more cells.

The battery gauge 656 can be configured to measure battery parameters such as current, voltage, and temperature. In some configurations, the battery gauge 656 is configured to measure the effect of a battery's discharge rate, temperature, age and other factors to predict remaining life within a certain percentage of error. In some configurations, the battery gauge 656 provides measurements to an application program that is configured to utilize the measurements to present useful power management data to a user. Power management data can include one or more of a percentage of battery used, a percentage of battery remaining, a battery condition, a remaining time, a remaining capacity (e.g., in watt hours), a current draw, and a voltage.

The power components 612 can also include a power connector (not shown), which can be combined with one or more of the aforementioned I/O components 610. The power components 612 can interface with an external power system or charging equipment via a power I/O component 610. Other configurations can also be utilized.

The disclosure presented herein also encompasses the subject matter set forth in the following clauses:

Clause 1. A computer-implemented method, comprising: exposing an application programming interface (API) by way of an operating system executing on a computing device, the API configured to receive activity data from an application, the activity data identifying the application and an activity associated with the application; presenting a first user interface (UI) comprising at least one UI control; receiving a selection of the at least one UI control, a selection of the at least one UI control indicating whether the activity data is to be collected or is not to be collected at the computing device; receiving the activity data from the application at the API; and discarding the activity data responsive to determining that a selection of the at least one UI control has been received indicating that the activity data is not to be collected at the computing device.

Clause 2. The computer-implemented method of clause 1, further comprising storing the activity data received from the application in a data store responsive to determining that a selection of the at least one UI control has been received indicating that the activity data is to be collected at the computing device.

Clause 3. The computer-implemented method of clauses 1 or 2, further comprising retrieving the activity data received from the application from the data store and presenting the activity data received from the application in a second UI.

Clause 4. The computer-implemented method of any of clauses 1-3, wherein the first UI further comprises at least one second UI control, and wherein the method further comprises receiving a selection of the at least one second UI control and, responsive to the selection of the at least one second UI control, removing previously stored activity data from the data store.

Clause 5. The computer-implemented method of any of clauses 1-4, further comprising: receiving activity data from one or more other computing devices; storing the activity data received from the one or more other computing devices in the data store; and presenting the activity data received from the one or more other computing devices in the second UI.

Clause 6. The computer-implemented method of any of clauses 1-5, further comprising providing the activity data received from the application to the one or more other computing devices.

Clause 7. The computer-implemented method of any of clauses 1-6, wherein the second UI further comprises activity data received from one or more other applications.

Clause 8. A computing device, comprising: one or more processors; a display; and at least one computer storage medium having computer executable instructions stored thereon which, when executed by the one or more processors, cause the computing device to present a user interface (UI) on the display, the UI comprising at least one UI control; receive a selection of the at least one UI control, the selection of the UI control indicating whether activity data is to be collected or is not to be collected at the computing device; receive the activity data at an application programming interface (API) exposed by an operating system (OS) executing on the one or more processors, the activity data identifying an application and an activity associated with the application; and discard the activity data responsive to determining that a selection of the at least one UI control has been received indicating that the activity data is not to be collected at the computing device.

Clause 9. The computing device of clause 8, wherein the at least one computer storage medium stores further computer executable instructions to cause the activity data received from the application to be stored in a data store responsive to determining that a selection of the at least one UI control has been received indicating that the activity data is to be collected at the computing device.

Clause 10. The computing device of any of clauses 8 and 9, wherein the at least one computer storage medium stores further computer executable instructions to retrieve the activity data received from the application from the data store and present the activity data received from the application in a second UI.

Clause 11. The computing device of any of clauses 8-10, wherein the first UI further comprises at least one second UI control, and wherein the at least one computer storage medium stores further computer executable instructions to receive a selection of the at least one second UI control and, responsive to the selection of the at least one second UI control, remove previously stored activity data from the data store.

Clause 12. The computing device of any of clauses 8-11, wherein the at least one computer storage medium stores further computer executable instructions to: receive activity data from one or more other computing devices; store the activity data received from the one or more other computing devices in the data store; and present the activity data received from the one or more other computing devices in the second UI.

Clause 13. The computing device of any of clauses 8-12, wherein the at least one computer storage medium stores further computer executable instructions to provide the activity data received from the application to the one or more other computing devices.

Clause 14. The computing device of any of clauses 8-13, wherein the second UI further comprises activity data received from one or more other applications.

Clause 15. At least one computer storage medium having computer executable instructions stored thereon which, when executed by one or more processors of a computing device, cause the computing device to: present a user interface (UI) on a display of the computing device, the UI comprising at least one UI control; receive a selection of the at least one UI control, the selection of the UI control indicating whether activity data is to be collected or is not to be collected at the computing device; receive the activity data at an application programming interface (API) exposed by an operating system (OS) executing on the one or more processors, the activity data identifying an application and an activity associated with the application; and discard the activity data responsive to determining that a selection of the at least one UI control has been received indicating that the activity data is not to be collected at the computing device.

Clause 16. The at least one computer storage medium of clause 15, storing further computer executable instructions which, when executed by the one or more processors, cause the activity data received from the application to be stored in a data store responsive to determining that a selection of the at least one UI control has been received indicating that the activity data is to be collected at the computing device.

Clause 17. The at least one computer storage medium of any of clauses 15 and 16, storing further computer executable instructions which, when executed by the one or more processors, retrieve the activity data received from the application from the data store and present the activity data received from the application in a second UI.

Clause 18. The at least one computer storage medium of any of clauses 15-17, wherein the first UI further comprises at least one second UI control, and wherein the at least one computer storage medium stores further computer executable instructions to receive a selection of the at least one second UI control and, responsive to the selection of the at least one second UI control, remove previously stored activity data from the data store.

Clause 19. The at least one computer storage medium of any of clauses 16-18, storing further computer executable instructions which, when executed by the one or more processors, cause the computing device to: receive activity data from one or more other computing devices; store the activity data received from the one or more other computing devices in the data store; and present the activity data received from the one or more other computing devices in the second UI.

Clause 20. The at least one computer storage medium of any of clauses 16-19, storing further computer executable instructions which, when executed by the one or more processors, provide the activity data received from the application to the one or more other computing devices.

Based on the foregoing, it should be appreciated that various technologies for suppressing the collection of activity data by an operating system have been disclosed herein. Although the subject matter presented herein has been described in language specific to computer structural features, methodological and transformative acts, specific computing machinery, and computer readable media, it is to be understood that the subject matter set forth in the appended claims is not necessarily limited to the specific features, acts, or media described herein. Rather, the specific features, acts and mediums are disclosed as example forms of implementing the claimed subject matter.

The subject matter described above is provided by way of illustration only and should not be construed as limiting. Various modifications and changes can be made to the subject matter described herein without following the example configurations and applications illustrated and described, and without departing from the scope of the present disclosure, which is set forth in the following claims.

What is claimed is:

1. A computer-implemented method, comprising:
   exposing, by way of an operating system executing on a computing device, an application programming interface (API) that is configured to receive activity data from an application, the activity data identifying the application and an activity associated with the application;
   receiving a first instance of the activity data from the application at the API that is exposed by way of the OS;
   storing the first instance of the activity data at a designated storage location of the computing device;

subsequent to storing the first instance, presenting a user interface (UI) comprising at least one UI control;
receiving a selection, of the at least one UI control, that indicates whether the activity data is to be collected or is not to be collected at the computing device;
subsequent to receiving the selection, receiving a second instance of the activity data from the application at the API that is exposed by way of the OS; and
responsive to the selection indicating that the activity data is not to be collected at the computing device, discarding the second instance of the activity data by way of the API to prevent the OS from storing the second instance of the activity data at the designated storage location of the computing device.

2. The computer-implemented method of claim 1, wherein the selection of the at least one UI control is a first selection, and wherein the computer-implemented method further comprises:
subsequent to receiving the first selection of the at least one UI control indicating that the activity data is not to be collected, receiving a second selection of the at least one UI control indicating that collection of activity data is to be resumed at the computing device;
receiving a third instance of the activity data from the application at the API; and
based on the second selection, storing the third instance of the activity data received from the application in the designated storage location.

3. The computer-implemented method of claim 2, further comprising:
retrieving the third instance of the activity data from the designated storage location, and causing a display of the computing device to present the third instance of the activity data in an activity history UI.

4. The computer-implemented method of claim 3, wherein the first UI further comprises at least one second UI control, and wherein the computer-implemented method further comprises receiving a third selection of the at least one second UI control and, responsive to the third selection of the at least one second UI control, removing the first instance of the activity data from the designated storage location.

5. The computer-implemented method of claim 3, further comprising:
receiving other activity data from one or more other computing devices;
storing the other activity data received from the one or more other computing devices in the designated storage location; and
causing the display to present the other activity data received from the one or more other computing devices in the activity history UI.

6. The computer-implemented method of claim 5, further comprising providing at least some of the activity data received from the application to the one or more other computing devices.

7. The computer-implemented method of claim 3, wherein the activity history UI further comprises other activity data received from one or more other applications.

8. The computer-implemented method of claim 1, wherein the computer-implemented method further comprises:
presenting, on the display of the computing device, an activity history UI that comprises one or more UI controls that are associated with previously collected activity data that is provided to the OS by one or more applications via the API;
receiving a selection of an individual UI control, of the one or more UI controls, that corresponds to an individual application, of the one or more applications, and a particular activity that was previously being performed by the individual application; and
responsive to the selection of the individual UI control that is presented via the activity history UI, causing the individual application to resume performance of the particular activity.

9. A computing device, comprising:
one or more processors;
a display; and
at least one computer storage medium having computer executable instructions stored thereon which, when executed by the one or more processors, cause the computing device to:
present a user interface (UI) on the display, the UI comprising at least one UI control;
receive a first selection, of the at least one UI control, indicating whether activity data is to be collected or is not to be collected at the computing device;
receive a first instance of the activity data at an application programming interface (API) exposed by an operating system (OS) executing on the computing device, the first instance of the activity data identifying an application and an activity associated with the application;
discard the first instance of the activity data responsive to determining that the first selection of the at least one UI control indicates that the activity data is not to be collected at the computing device, wherein discarding the first instance of the activity data includes preventing the OS from storing the first instance of the activity data at a data store of the computing device;
subsequent to discarding the first instance of the activity data, receive a second selection, of the at least one UI control, indicating whether the activity data is to be collected or is not to be collected at the computing device;
subsequent to receiving the second selection, receive a second instance of the activity data at the API;
store the second instance of the activity data responsive to determining that the second selection of the at least one UI control indicates that the activity data is to be collected at the computing device, wherein storing the second instance of the activity data includes causing the OS to store the second instance of the activity data at the data store of the computing device.

10. The computing device of claim 9, wherein the at least one computer storage medium stores further computer executable instructions to retrieve the second instance of the activity data received from the application from the data store and present the second instance of the activity data received from the application in an activity history UI.

11. The computing device of claim 10, wherein the activity history UI further comprises other activity data received from one or more other applications.

12. The computing device of claim 9, wherein the UI further comprises at least one second UI control, and wherein the at least one computer storage medium stores further computer executable instructions to receive a selection of the at least one second UI control and, responsive to the selection of the at least one second UI control, remove previously stored activity data from the data store.

13. The computing device of claim 9, wherein the at least one computer storage medium stores further computer executable instructions to:
- receive other activity data from one or more other computing devices;
- store the other activity data received from the one or more other computing devices in the data store; and
- present the other activity data received from the one or more other computing devices in an activity history UI.

14. The computing device of claim 13, wherein the at least one computer storage medium stores further computer executable instructions to provide the activity data received from the application to the one or more other computing devices.

15. The computing device of claim 9, wherein the instruction further causes the computing device to:
- present, on the display of the computing device, an activity history UI that comprises one or more UI controls that are associated with previously collected activity data that is provided to the OS by one or more applications via the API;
- receive a selection of an individual UI control, of the one or more UI controls, that corresponds to an individual application, of the one or more applications, and a particular activity that was previously being performed by the individual application; and
- responsive to the selection of the individual UI control that is presented via the activity history UI, cause the individual application to resume performance of the particular activity.

16. At least one computer storage medium having computer executable instructions stored thereon which, when executed by one or more processors of a computing device, cause the computing device to:
- present a user interface (UI) on a display of the computing device, the UI comprising at least one UI control;
- receive a selection, of the at least one UI control, indicating that activity data is not to be collected at the computing device;
- receive a first instance of the activity data at an application programming interface (API) exposed by an operating system (OS) executing on the computing device, the first instance of the activity data identifying an application and an activity associated with the application; and
- based on the selection, discard the first instance of the activity data by way of the API to prevent the OS from storing the first instance of the activity data at a designated storage location at which a second instance of the activity data has been previously stored by the OS based on a previous selection of the at least one UI control indicating that the activity data is to be collected at the computing device.

17. The at least one computer storage medium of claim 16, wherein the UI further comprises at least one second UI control, and wherein the at least one computer storage medium stores further computer executable instructions to receive a selection of the at least one second UI control and, responsive to the selection of the at least one second UI control, remove previously stored activity data from the data store.

18. The at least one computer storage medium of claim 16, storing further computer executable instructions which, when executed by the one or more processors, cause the computing device to:
- receive other activity data from one or more other computing devices;
- store the other activity data received from the one or more other computing devices in the data store; and
- present the other activity data received from the one or more other computing devices in an activity history UI.

19. The at least one computer storage medium of claim 18, storing further computer executable instructions which, when executed by the one or more processors, provide the activity data received from the application to the one or more other computing devices.

20. The at least one computer storage medium of claim 18, storing further computer executable instructions which, when executed by the one or more processors, cause the computing device to:
- present, on the display of the computing device, an activity history UI that comprises one or more UI controls that are determined based on previously collected activity data that is provided to the OS by one or more applications via the API;
- receive a selection of an individual UI control, of the one or more UI controls, that corresponds to an individual application and a particular activity that was previously being performed by the individual application; and
- responsive to the selection of the individual UI control that is presented via the activity history UI, cause the individual application to resume performance of the particular activity.

* * * * *